United States Patent
Dubberstein et al.

(10) Patent No.: US 7,670,293 B2
(45) Date of Patent: Mar. 2, 2010

(54) METHOD AND SYSTEM FOR SCAN SEQUENCING IN AN ULTRASOUND IMAGING SYSTEM

(75) Inventors: David Thomas Dubberstein, Waukesha, WI (US); Anne Lindsay Hall, New Berlin, WI (US)

(73) Assignee: General Electric Company, Schenectady, NY (US)

(*) Notice: Subject to any disclaimer, the term of this patent is extended or adjusted under 35 U.S.C. 154(b) by 1171 days.

(21) Appl. No.: 11/252,006

(22) Filed: Oct. 17, 2005

(65) Prior Publication Data

US 2007/0088215 A1    Apr. 19, 2007

(51) Int. Cl.
*A61B 8/00* (2006.01)
(52) U.S. Cl. .................. 600/453; 600/441; 600/458
(58) Field of Classification Search .............. 600/437, 600/458, 453; 700/90
See application file for complete search history.

(56) References Cited

U.S. PATENT DOCUMENTS

| | | | |
|---|---|---|---|
| 5,501,223 A * | 3/1996 | Washburn et al. ........... 600/455 |
| 6,159,153 A | 12/2000 | Dubberstein et al. |
| 6,221,022 B1 | 4/2001 | Miller et al. |
| 6,267,725 B1 | 7/2001 | Dubberstein |
| 6,443,897 B1 | 9/2002 | Dubberstein et al. |

* cited by examiner

*Primary Examiner*—Eric F Winakur
*Assistant Examiner*—Katherine L Fernandez
(74) *Attorney, Agent, or Firm*—Dean Small; Small Patent Law Group (57) ABSTRACT

Methods and systems for scan sequencing in an ultrasound imaging system are provided. The method includes determining an interleave factor based at least partially on a pulse repletion interval (PRI). The method further includes dividing a total number of colorflow imaging vectors into interleave groups based on the interleave factor. Further, the method includes modifying at least one scan sequencing parameter such that all colorflow imaging vectors are included in a colorflow region of interest (ROI).

18 Claims, 9 Drawing Sheets

METHOD AND SYSTEM FOR SCAN SEQUENCING IN AN ULTRASOUND IMAGING SYSTEM

BACKGROUND OF THE INVENTION

This invention relates generally to an ultrasound colorflow imaging system and, more particularly, to methods and systems for scan sequencing in an ultrasound colorflow imaging system.

Ultrasound imaging is used in a variety of clinical settings, including, for example, obstetrics, gynecology, cardiology and oncology. Ultrasound imaging is also used to study anatomical structures, detect anomalies in tissues and measure blood flow within a body. In ultrasound imaging systems, a transducer probe generates and transmits acoustic waves and receives the echoes that are reflected, for example, by a body or a portion thereof.

Doppler ultrasound, which is based upon the Doppler effect, is used to measuring the rate of blood-flow through the human body, for example, through the heart, major arteries, and veins in the body. Doppler ultrasound works on the principle that the frequency of the reflected ultrasound pulses (echoes) that are reflected from a moving object is different from the frequency of the transmitted ultrasound pulses. The frequency of the echoes is higher than that of the transmitted ultrasound pulses if the object is moving towards the probe and vice versa. Doppler ultrasound measures the change in frequency of the echoes to calculate the flow velocity of a body fluid, such as blood. The change in the frequency of the echoes is also referred to as a Doppler shift.

One form of Doppler ultrasound is ultrasound colorflow imaging, in which a color is assigned to the direction of flow. For example, red color is assigned to a flow that is towards the transducer probe, and blue color is assigned to a flow that is away from the transducer probe. In ultrasound colorflow imaging, multiple ultrasound pulses are transmitted into the body that is to be examined. The Doppler shift between the ultrasound pulses is measured to provide an estimate of blood flow or velocity of a tissue. An ultrasonographer selects a velocity scale of the ultrasound pulses. The velocity scale determines a round trip travel time of the ultrasound pulse. The round trip travel time is the time taken by an ultrasound pulses to travel to the bottom of a colorflow region of interest (ROI) and back to the transducer probe for subsequent processing. The round trip travel time determines a pulse repetition frequency (PRF) of the ultrasound pulses in a packet that is formed from subsequent firing of the ultrasound pulses. PRF is the number of ultrasound pulses that are transmitted by the transducer probe in one second.

The scanning sequence of the ultrasound pulses is described in equation (1):

$$V1\ V1\ V1\ V2\ V2\ V2\ V3\ V3\ V3 \ldots \tag{1}$$

where V1 is a colorflow imaging vector that corresponds to an ultrasound pulse that is fired in direction 1, V2 is a colorflow imaging vector that corresponds to an ultrasound pulse that is fired in direction 2, V3 is a colorflow imaging vector that corresponds to an ultrasound pulse that is fired in direction 3, and Where, for example, three colorflow imaging vectors being fired in the same direction constitute a packet.

When the velocity scale of the ultrasound pulses described in equation (1) is changed to a lower value, the PRF of the ultrasound pulses is reduced. As a result, the subsequent frame rate for formation of an ultrasound image is decreased. When the velocity scale of the ultrasound pulses described in equation (1) is changed to a higher value, the PRF of the ultrasound pulses is increased, and the round trip travel time for the ultrasound pulses is decreased. As a result, most of the time between transmissions of the ultrasound pulses is not used in the formation of the ultrasound image.

In order to more efficiently utilize the time between transmissions of the ultrasound pulses, and to maintain the frame rate simultaneously, the colorflow imaging vectors are interleaved. The interleaving of the colorflow imaging vectors is possible when a pulse repetition interval (PRI) of the colorflow imaging vector is at least two times greater than the round trip travel time of the colorflow imaging vectors. PRI is the time that is elapsed between the beginnings of emissions of two consecutive colorflow imaging vectors. The scanning sequence of the interleaved colorflow imaging vectors is described in equation (2):

$$V1\ V2\ V3\ V1\ V2\ V3\ V1\ V2\ V3 \ldots \tag{2}$$

As a result of interleaving, the packets for the three colorflow imaging vectors V1, V2, and V3 are fired at the same instant of time. In the scanning sequence as described in equation (2), the time elapsed between the adjacent fired colorflow imaging vector is greater than the round trip travel time of the colorflow imaging vectors. The PRF of the interleaved colorflow imaging vector (as described in equation (2)) is less than the PRF of colorflow imaging vector without interleaving (as described in equation (1)). The interleaving of colorflow imaging vectors therefore maintains the frame rate even though the PRF of the colorflow imaging vectors is reduced.

For interleaving of colorflow imaging vectors, an interleave factor is determined. The total number of colorflow imaging vectors are divided into interleave groups based on the interleave factor. However, the total number of colorflow imaging vectors, may not get evenly divided into interleave groups. As a result, the last interleave group may be shorter than the other interleave groups. Therefore, the last interleave group is appended with extra colorflow imaging vectors. However, it may happen that while displaying the ultrasound image, the extra colorflow imaging vectors, which are beyond the edge of the color region of interest (ROI) are not used in the formation of the ultrasound image. Further, time required in firing the extra colorflow imaging vectors, and the information that is acquired through firing of the extra colorflow imaging vectors gets wasted.

BRIEF DESCRIPTION OF THE INVENTION

In one exemplary embodiment, a method for scan sequencing in an ultrasound imaging system is provided. The method includes determining an interleave factor based at least partially on a pulse repletion interval (PRI). The method further includes dividing a total number of colorflow imaging vectors into interleave groups based on the interleave factor. Further, the method includes modifying at least one scan sequencing parameter such that all colorflow imaging vectors are included in a colorflow region of interest (ROI).

In another exemplary embodiment, a system for scan sequencing in an ultrasound colorflow imaging system is provided. The system includes a factor calculation module that is configured to determine an interleave factor based at least partially on a PRI. The system further includes a division module that is configured to divide a total number of colorflow imaging vectors into interleave groups based on the interleave factor. Further, the system includes a modification module that is configured to modify at least one scan sequencing parameter such that all colorflow imaging vectors are included in a ROI.

DETAILED DESCRIPTION OF THE INVENTION

Various embodiments of the invention provide a method and system for scan sequencing in an ultrasound colorflow imaging system. The ultrasound colorflow imaging system may be, for example, a two dimensional (2D) ultrasound imaging system, a three dimensional (3D) ultrasound imaging system, or a Doppler ultrasound imaging system.

Further, various embodiments of the invention provide for determining an interleave factor based at least partially on a pulse repetition interval (PRI). PRI is the time that is elapsed between the beginning of emissions of two consecutive colorflow imaging vectors. In addition, various embodiments of the invention provide for dividing a total number of colorflow imaging vectors into interleave groups based on the interleave factor. In various embodiments of the invention, a colorflow imaging vector may also be referred to as a scan line. The scan line is a single line of an ultrasound data. Furthermore, various embodiments of the invention provide for modifying at least one scan sequencing parameter such that all colorflow imaging vectors are included in a colorflow region of interest (ROI). The colorflow ROI refers to the region in which an object to be imaged is placed.

In an exemplary embodiment of the invention, all colorflow imaging vectors are included in a colorflow ROI by modifying the positions of the colorflow imaging vectors. (Further details are provided in FIG. 4). In another exemplary embodiment of the invention, all colorflow imaging vectors are included in the colorflow ROI by modifying size of the colorflow ROI. (Further details are provided in FIG. 6). In yet another exemplary embodiment of the invention, all colorflow imaging vectors are included in the colorflow ROI by modifying size of the interleave group. (Further details are provided in FIG. 8).

Figure 1:
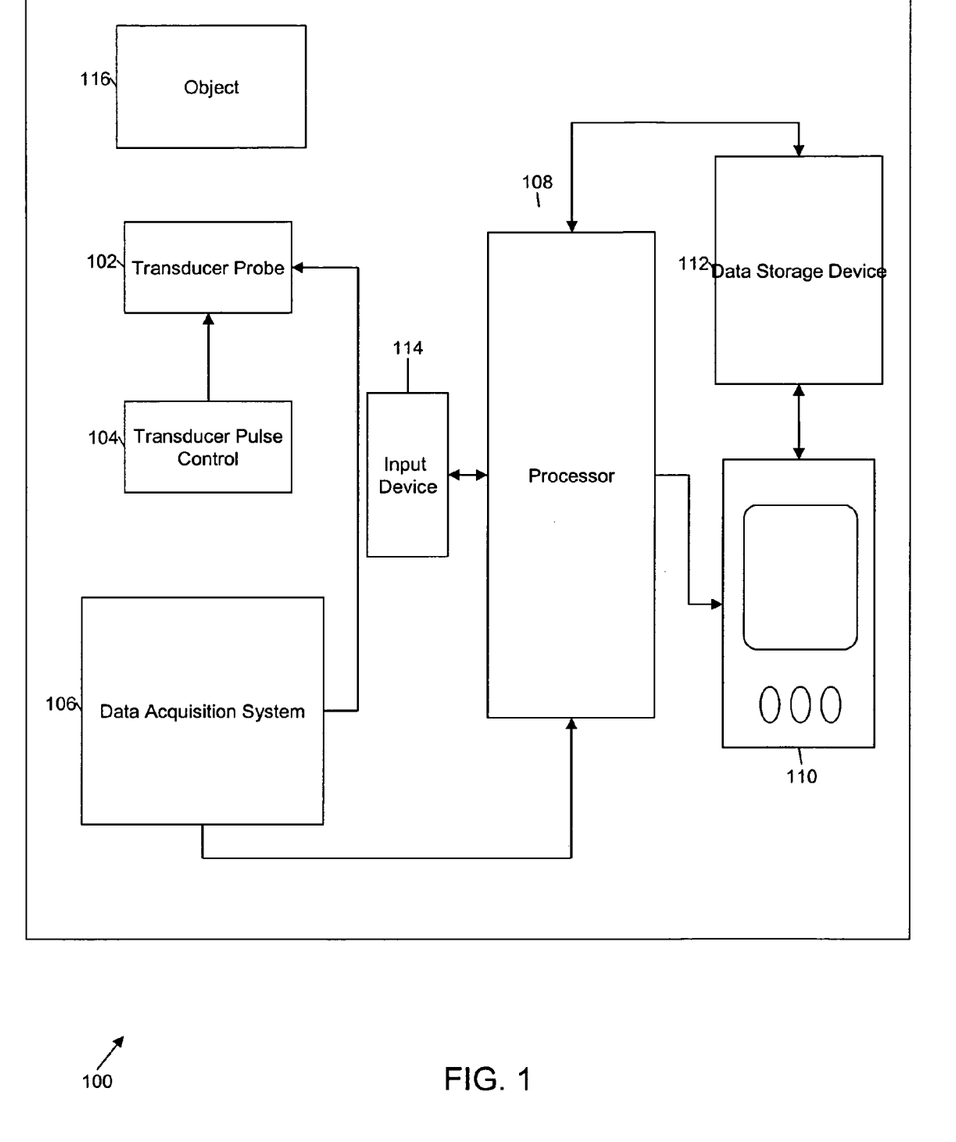
FIG. 1 is a block diagram of an ultrasound colorflow imaging system, in accordance with an exemplary embodiment of the invention.

FIG. 1 is a block diagram of an ultrasound colorflow imaging system 100, in accordance with an exemplary embodiment of the invention. Ultrasound colorflow imaging system 100 includes a transducer probe 102, a transducer pulse control 104, a data acquisition system (DAS) 106, a processor 108, a display unit 110, a data storage unit 112, and an input device 114. Transducer probe 102 includes at least one quartz crystal (not shown in FIG. 1). In various embodiments of the invention, the quartz crystal may also be referred to as a piezoelectric crystal. Shape of the quartz crystal changes rapidly when an electric current is applied to it. The rapid changes in the shape of the quartz crystal and the subsequent vibrations of the quartz crystal result in emission of a plurality of ultrasound pulses. The ultrasound pulses are output at a high frequency, and the frequency of the ultrasound pulses ranges between 1 to 17 megahertz (and all subranges there between). The ultrasound pulses are transmitted into an object 116. Examples of object 116 include a heart, a vertebra, an aorta, a liver, a lung, a kidney, a fetus, a tumor of an ovary, a tumor of a breast, and the like. The ultrasound pulses travel into object 116 and hit a boundary, an obstruction, or other interface between tissues. For example, the ultrasound pulses may hit a boundary between a fluid and a soft tissue, or a boundary between the soft tissue and a bone, and so forth. The boundary may cause some of the ultrasound pulses to be reflected back while other ultrasound pulses continue to travel through object 116 to the next boundary. In various embodiments of the invention, the ultrasound pulses that get reflected may also be referred to as echoes. The echoes are received by transducer probe 102. The quartz crystal generates electric pulses on receiving the echoes. In various embodiments of the invention, the quartz crystal may be simultaneously used to emit ultrasound pulses, and receive the echoes. Transducer probe 102 may be moved across the surface of object 116 and angled to obtain various views of object 116. In an embodiment of the invention, transducer probe 102 may be, inserted through various openings of object 116, for example a rectum, an esophagus, and the like.

Transducer probe 102 includes an acoustic lens (not shown in FIG. 1) that is configured to assist transducer probe 102 to focus the ultrasound pulses into object 116. Transducer pulse control 104 is used by an ultrasonographer to set and change the frequency of the ultrasound pulses, the duration of the ultrasound pulses, and scan mode of ultrasound colorflow imaging system 100. The scan mode of ultrasound colorflow imaging system refers to the mode in which object 116 is scanned. Examples of the scan mode include A-mode, B-mode, C-mode, M-mode, and the like. The commands from the ultrasonographer are further translated into electric currents. The electric currents are applied to the quartz crystal in transducer probe 102.

DAS 106 receives the electric pulses that are generated by the quartz crystal when the quartz crystal receives the echoes. DAS 106 digitizes the electric pulses for subsequent processing. The electric pulses that are digitized by DAS 106 are hereinafter referred to as digitized signals. In various embodiments of the invention, DAS 106 may be a magnetic or an optical storage media, such as, but not limited to, a hard disk, a tape drive, a compact disc (CD), and a memory chip.

Further, processor 108 receives the digitized signals from DAS 106. Processor 108 further performs scan sequencing on the received digitized signals. The scan sequencing is performed in order to include all colorflow imaging vectors in the colorflow ROI. In an exemplary embodiment of the invention, computer programs and other instructions may be uploaded into processor 108 through input device 114. Input device 114 is also configured to receive manual inputs from the ultrasonographer. Examples of input device 114 include, but are not limited to, keys/buttons, audio inputs, and video input devices. Data storage unit 112 stores the ultrasound image of object 116. In one embodiment of the invention, data storage unit 112 may also store any intermediately processed digitized signals during the formation of the ultrasound image of object 116. Display unit 110 displays the ultrasound image of object 116. In various embodiments of the invention, display device 110 includes one of, but is not limited to, a cathode ray display, a Liquid Crystal Display (LCD), and plasma display.

Figure 2:
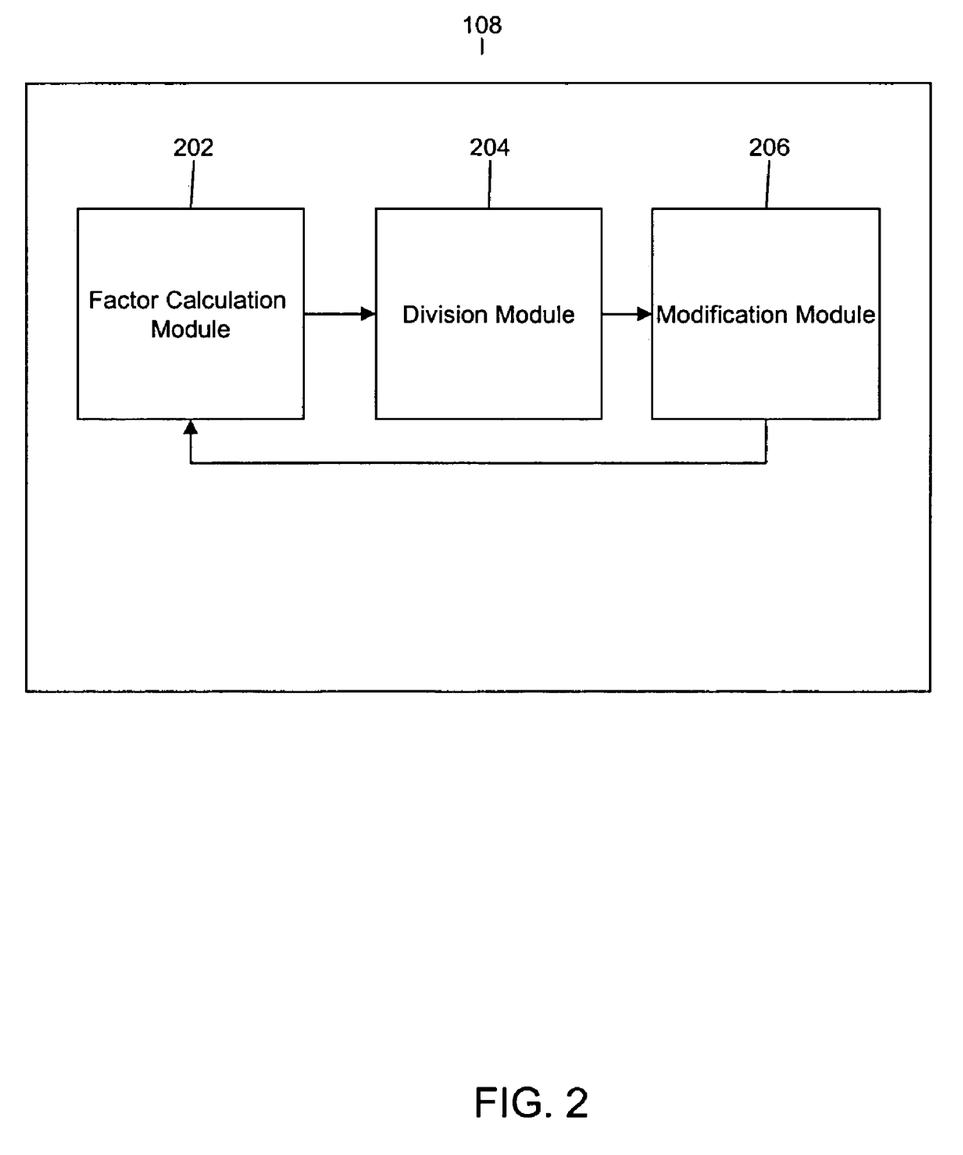
FIG. 2 is a block diagram of subcomponents of processor, in accordance with FIG. 1.

FIG. 2 is a block diagram of subcomponents of processor 108, in accordance with FIG. 1. Processor 108 includes a factor calculation module 202, a division module 204, and a modification module 206. Factor calculation module 202 is configured to determine an interleave factor based at least partially on a PRI. Division module 204 is configured to divide a total number of colorflow imaging vectors into interleave groups based on the interleave factor. Modification module 206 is configured to modify at least one scan sequencing parameter such that all colorflow imaging vectors are included in a colorflow ROI. In an exemplary embodiment of the invention, modification module 206 is configured to modify positions of the colorflow imaging vectors by decreasing the spacing of the colorflow imaging vectors. This ensures that all colorflow imaging vectors are included in the colorflow ROI. Thereafter, modification module 206 calculates a position for a new set of colorflow imaging vectors by calculating subsequent beamforming parameters for the new set of colorflow imaging vectors. As a result, Focal position and apodization could change depending on vector position. In another exemplary embodiment of the invention, modification module 206 modifies size of the colorflow ROI, for example, by extending the size of the colorflow ROI, or by changing a lateral width of the colorflow ROI. This ensures that all colorflow imaging vectors are included in the colorflow ROI. In yet another embodiment of the invention, modification module 206 modifies an interleave group size by determining a new interleave factor. The new interleave factor is an integer, which evenly divides the total number of colorflow imaging vectors into interleave groups. Further, the integer has a specific range with respect to the interleave factor, for example, from two to 32.

Figure 3:
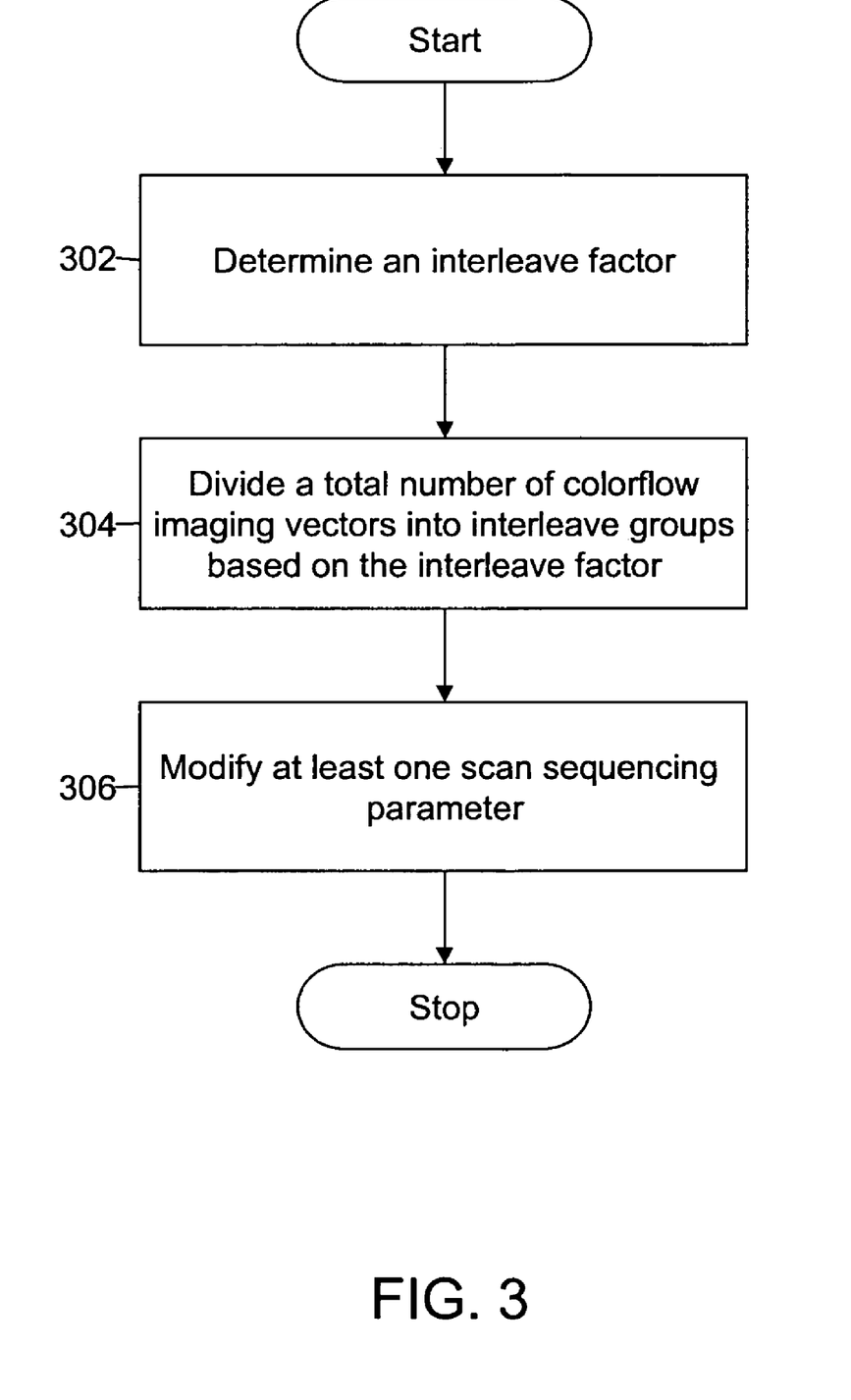
FIG. 3 is a flowchart illustrating a method for scan sequencing in an ultrasound imaging system, in accordance with an embodiment of the invention.

FIG. 3 is a flowchart illustrating a method for scan sequencing in an ultrasound imaging system, in accordance with an embodiment of the invention. At 302, factor calculation module 202 determines an interleave factor for the digitized signals that are received by processor 108. The interleave factor is based at least partially on a PRI. The PRI may be provided manually or as a pre-defined value, but it may be modified when using pulsed wave doppler and color simultaneously. The interleave factor further depends on a round trip travel time. The round trip travel time is the time taken by a colorflow imaging vector to travel to the bottom of a colorflow ROI and back to transducer probe 102 for subsequent processing. The colorflow imaging vectors pass through a colorflow ROI region. Object 116 is positioned within the colorflow ROI region for imaging. In an embodiment of the invention, the interleave factor may be determined in accordance with equation (3):

Interleave factor=int (PRI/round trip travel time)   (3)

At 304, division module 204 divides a total number of colorflow imaging vectors into interleave groups based on the interleave factor. However, the total number of colorflow imaging vectors, may not get evenly divided into interleave groups since the time of firing sequence cannot be altered. The time of firing sequence refers to the time in which the total number of colorflow imaging vectors is emitted from transducer probe 102. Therefore, division module 204 adds at least one extra colorflow imaging vector to the last interleave group to make the total number of colorflow imaging vectors in the interleave groups a multiple of the interleave factor.

For example, consider a situation in which a total number of colorflow imaging vectors is 35, and an interleave factor determined by factor calculation module 202 is eight. Division module 204 divides 35 colorflow imaging vectors into five interleave groups based on the interleave factor of eight. Each of the first, second, third, and fourth interleave groups include eight colorflow imaging vectors. However, the fifth interleave group includes three colorflow imaging vectors. Therefore, division module 204 adds five extra colorflow imaging vectors to the fifth interleave group. As a result, each interleave group includes eight colorflow imaging vectors.

At 306, modification module 206 modifies at least one scan sequencing parameter. In various embodiments of the invention, a scan sequencing parameter may also be referred to as a vector imaging characteristic. Modification module 206 modifies at least one scan sequencing parameter such that all colorflow imaging vectors are included in the colorflow ROI. In an exemplary embodiment of the invention, positions of the colorflow imaging vectors may be modified (further details are provided in FIG. 4). In another exemplary embodiment of the invention, size of the colorflow ROI may be modified (further details are provided in FIG. 6). In yet another exemplary embodiment of the invention, size of the interleave group may be modified (further details are provided in FIG. 8).

Figure 4:
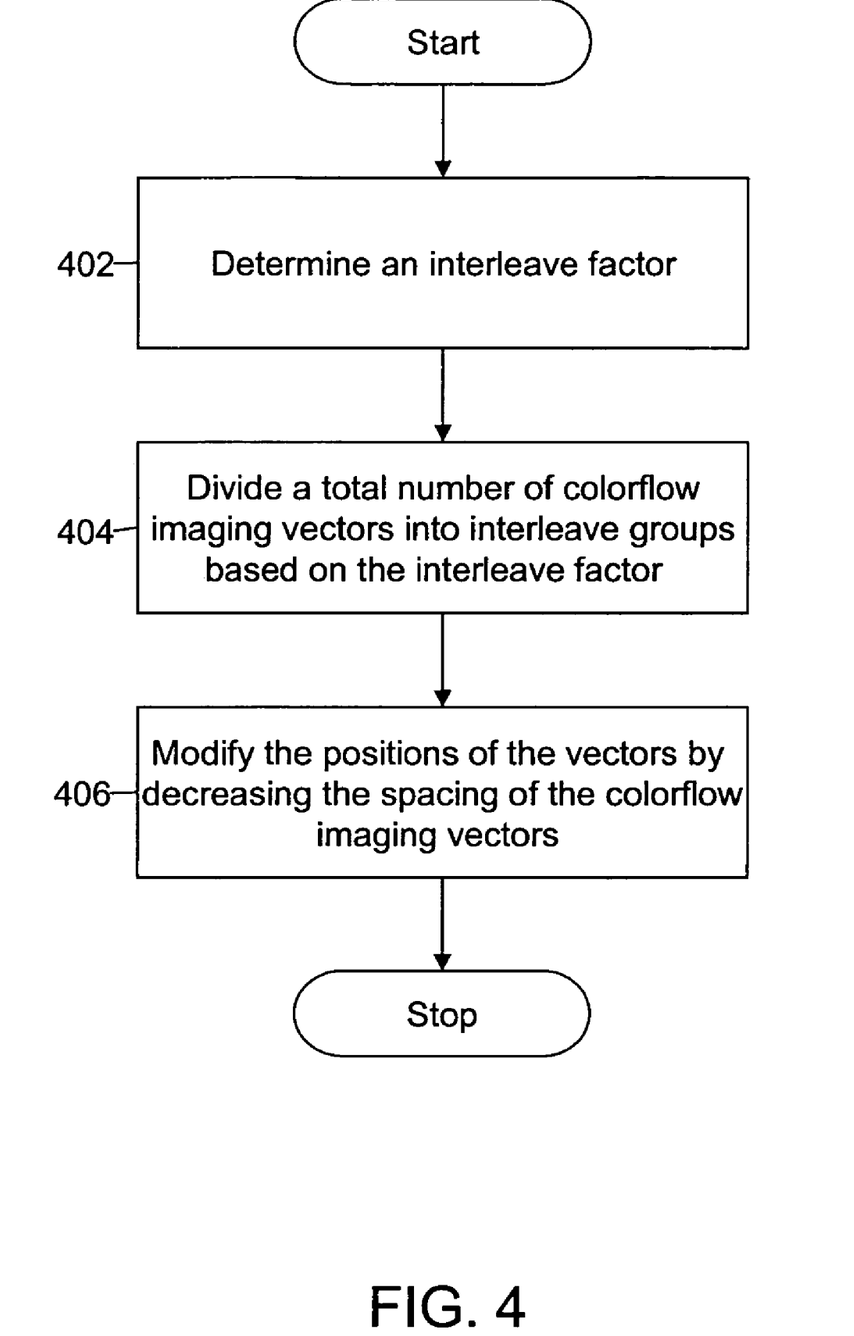
FIG. 4 is a flowchart illustrating a method for scan sequencing in an ultrasound imaging system, in accordance with an exemplary embodiment of the invention.

FIG. 4 is a flowchart illustrating a method for scan sequencing in an ultrasound imaging system, in accordance with an exemplary embodiment of the invention. 402 and 404 are identical to 302 and 304 respectively. At 404, modification module 206 modifies the positions of the colorflow imaging vectors by decreasing the spacing of the colorflow imaging vectors. This ensures that all colorflow imaging vectors are included in the colorflow ROI. In an exemplary embodiment of the invention, modification module 206 calculates a position for a new set of colorflow imaging vectors by calculating subsequent beamforming parameters for the new set of colorflow imaging vectors. As an example, if the new color vector spacing is s (cm), L is the length of the ROI (cm), then s=L/((interleave group size× number of interleave groups)−1). For a given interleave group size=5, a number of interleave groups=4, and an length of the ROI (L) of 19 (cm), then the new color vector spacing would be s=19/(5*4−1)=1 cm.

For example, consider a situation in which a total number of colorflow imaging vectors is 35, and an interleave factor determined by factor calculation module 202 is eight. Modification module 206 adds five extra colorflow vectors, and calculates a position for a new set of 40 colorflow imaging vectors. Division module 204 divides 40 colorflow imaging vectors into five interleave groups based on the interleave factor of eight, wherein each interleave group includes eight colorflow imaging vectors. Each colorflow imaging vectors is therefore positioned within the colorflow ROI, thereby increasing the density of the colorflow imaging vector in the ultrasound image of object 116.

Figure 5:
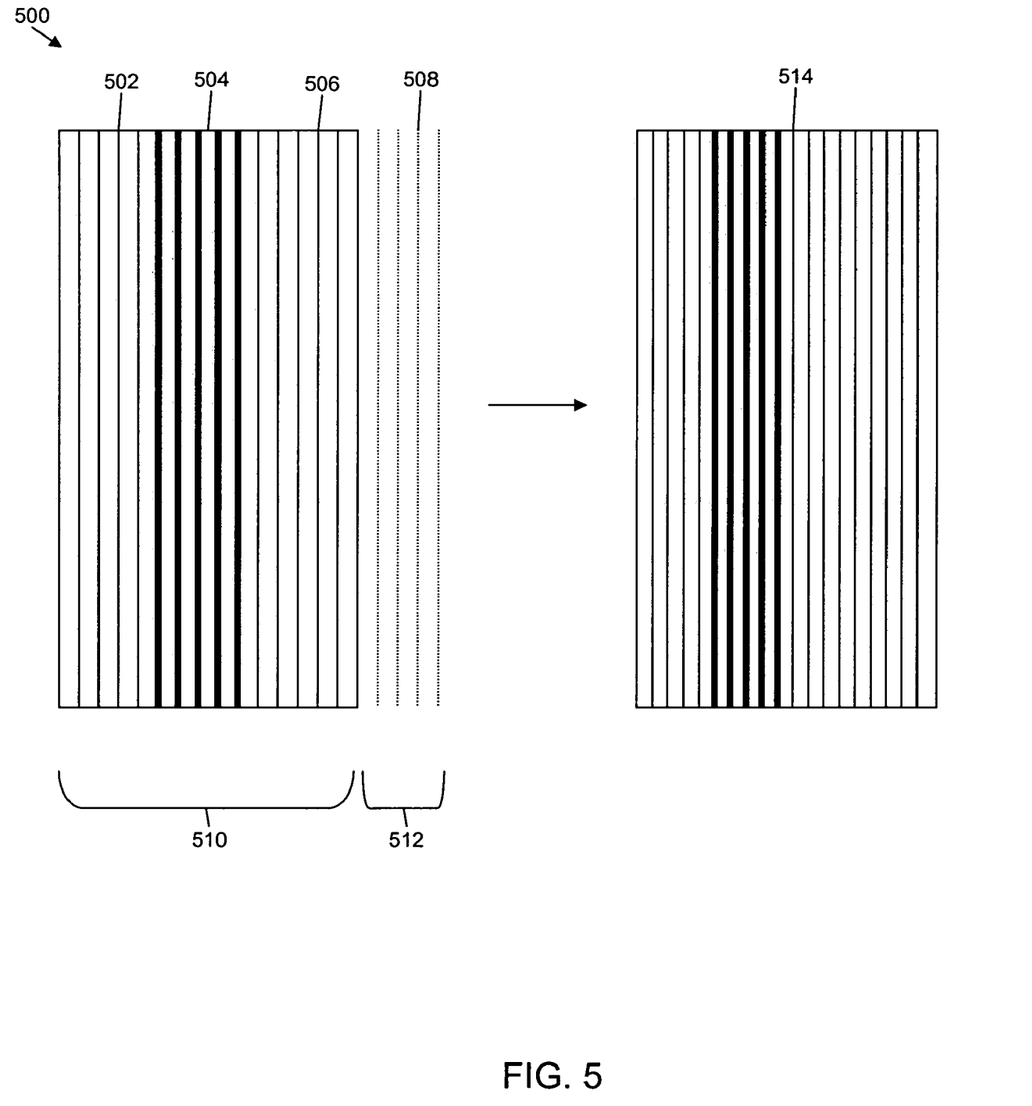
FIG. 5 is a block diagram illustrating the effect of applying the method for scan sequencing in an ultrasound imaging system, in accordance with FIG. 4.

FIG. 5 is a block diagram that exemplifies the effect of applying the method for scan sequencing in an ultrasound imaging system, in accordance with FIG. 4. The example includes a pattern 500 that includes a colorflow ROI. The colorflow ROI includes 16 colorflow imaging vectors. Further, the interleave factor determined by factor calculation module 202 is five. Division module 204 divides 16 colorflow imaging vectors into an interleave group 502, 504, 506, and 508, based on the interleave factor of five. Each of interleave groups 502, 504, and 506 includes five colorflow imaging vectors. However, interleave group 508 includes one colorflow imaging vector. Division module 204 adds four extra colorflow imaging vectors to interleave group 508. As a result, each of interleave groups 502, 504, 506, and 508 includes five colorflow imaging vectors. The extra colorflow imaging vectors that have been added by division module 204 are beyond the edge of a color ROI. A pattern 510 illustrates the imaged colorflow imaging vectors that are included in the colorflow ROI. A pattern 512 illustrates the non-imaged colorflow imaging vectors that are outside in the colorflow ROI.

A pattern 514 illustrates the effect of modifying the positions of the colorflow imaging vectors. Modification module 206 modifies a position for a set of twenty colorflow imaging vectors such that all colorflow imaging vectors are included in the colorflow ROI. As a result, the density of the colorflow imaging vectors is increased in the colorflow ROI of the ultrasound image of object 116. As an example, if the new color vector spacing is s (cm), L is the length of the ROI (cm), then s=L/((interleave group size×number of interleave groups)−1). For a given interleave group size=5, a number of interleave groups=4, and an length of the ROI (L) of 19 (cm), then the new color vector spacing would be s=19/(5*4−1)=1 cm.

Figure 6:
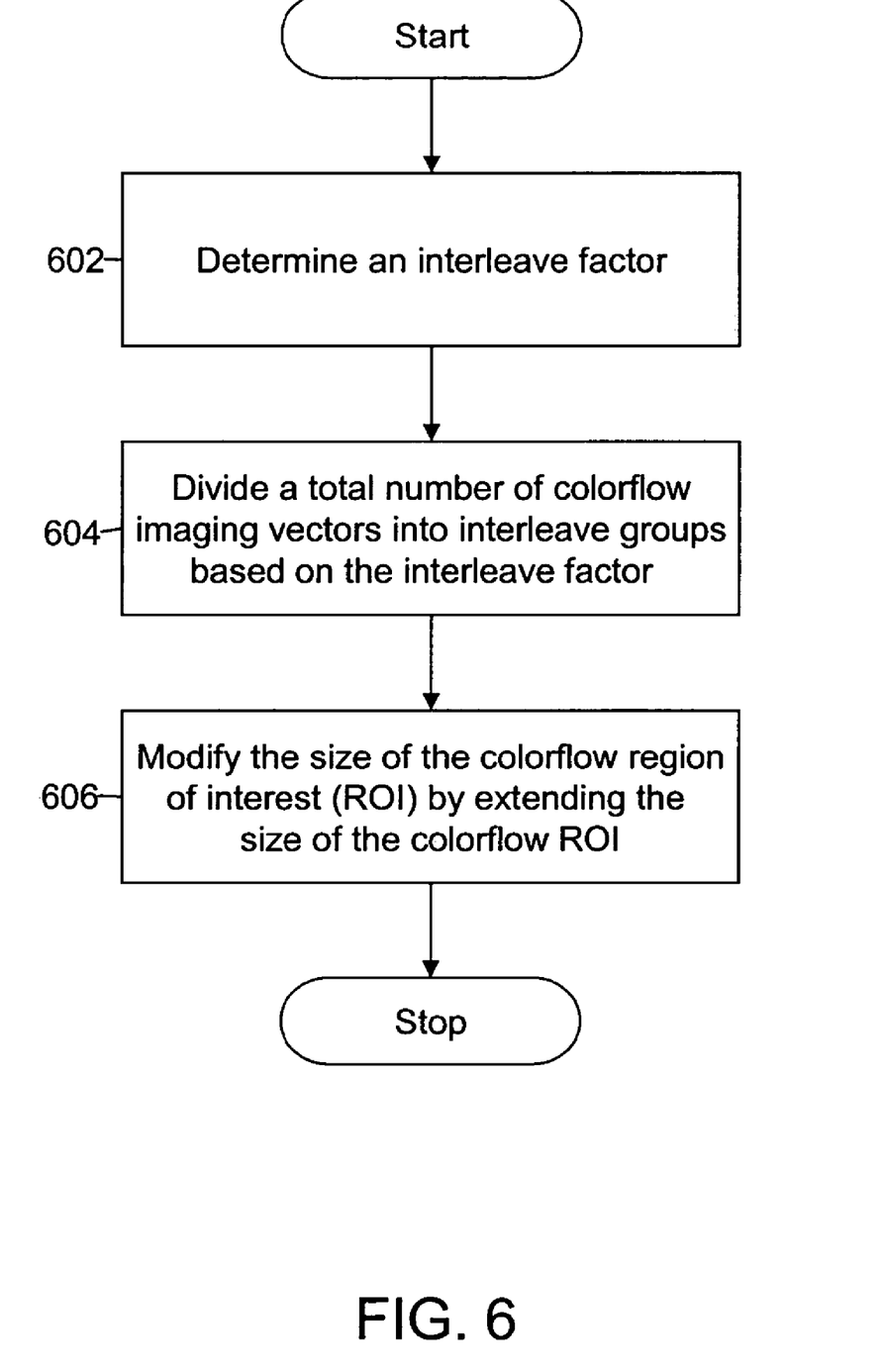
FIG. 6 is a flowchart illustrating a method for scan sequencing in an ultrasound imaging system, in accordance with another exemplary embodiment of the invention.

FIG. 6 is a flowchart illustrating a method for scan sequencing in an ultrasound imaging system, in accordance with another exemplary embodiment of the invention. 602 and 604 are identical to 302 and 304 respectively. At 606, modification module 206 modifies the size of the colorflow ROI by extending the size of the colorflow ROI. This ensures that all colorflow imaging vectors are displayed in the modified colorflow ROI. In an embodiment of the invention, modification module 206 changes a lateral width of the colorflow ROI such that all colorflow imaging vectors get accommodated in the modified colorflow ROI. Rearranging the above equation and solving for L results in L=s/(interleave group size×the number of interleave groups−1).

Figure 7:
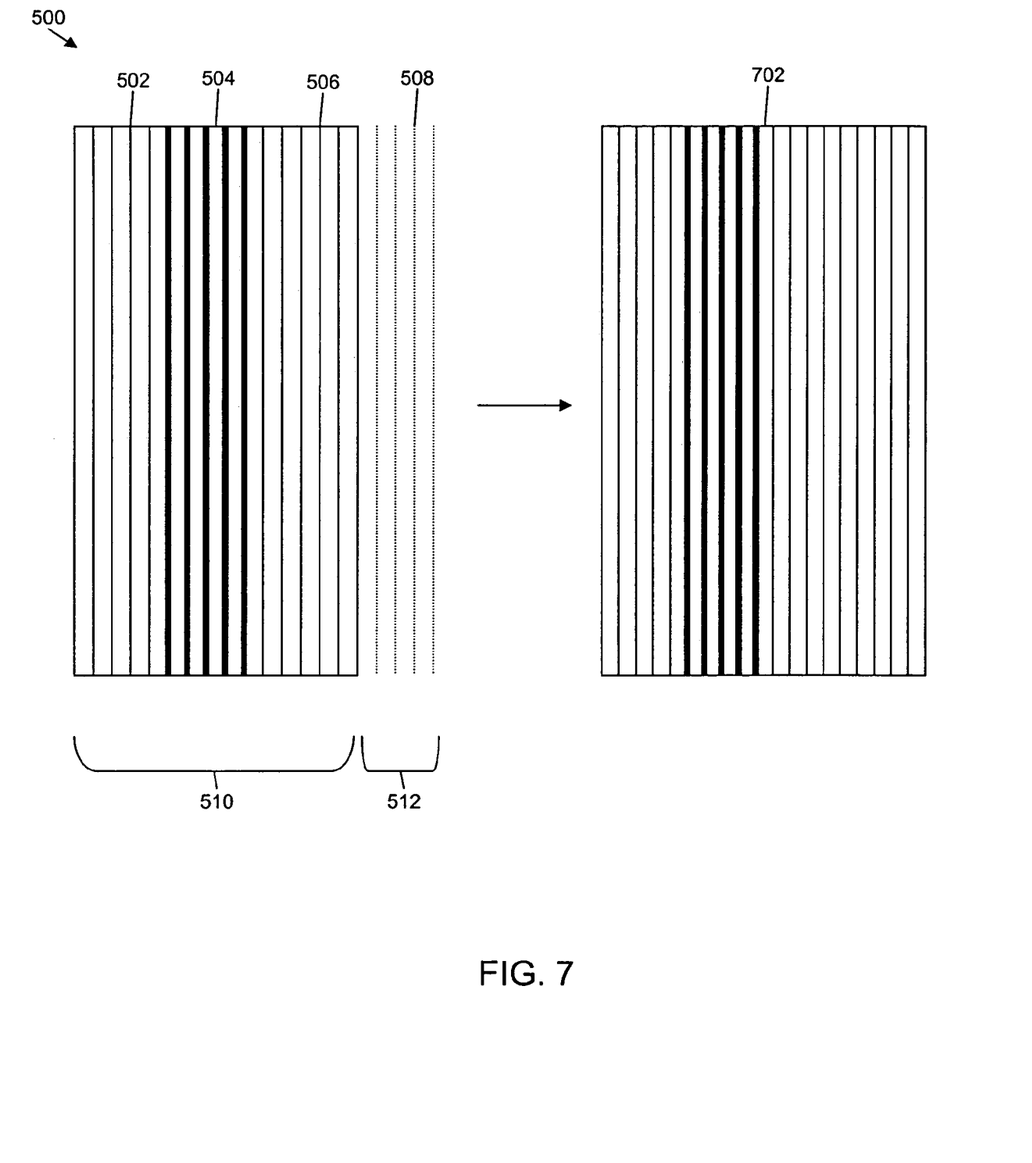
FIG. 7 is a block diagram illustrating the effect of applying the method for scan sequencing in an ultrasound imaging system, in accordance with FIG. 6.

FIG. 7 is a block diagram that exemplifies the effect of applying the method for scan sequencing in an ultrasound imaging system, in accordance with FIG. 6. The example uses pattern 500 that has been described in conjunction with FIG. 5. A pattern 702 shows the effect of modifying the size of the colorflow ROI. Modification module 206 extends the lateral width of the colorflow ROI. This ensures that all colorflow imaging vectors get accommodated in the modified colorflow ROI. The size of the color ROI is increased, but the color ROI is usually a subset of the b mode visualization area.

Figure 8:
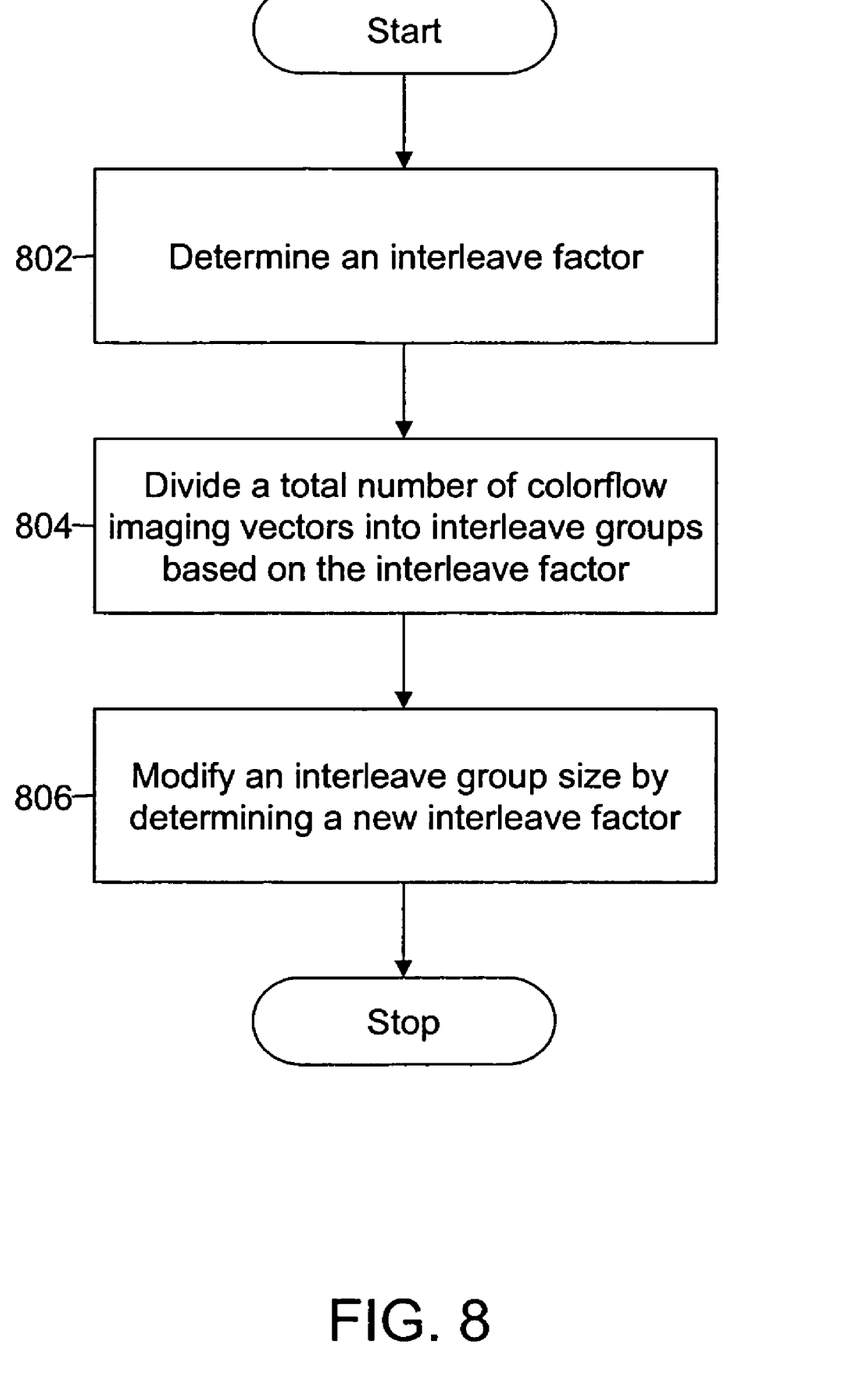
FIG. 8 is a flowchart illustrating a method for scan sequencing in an ultrasound imaging system, in accordance with yet another exemplary embodiment of the invention.

FIG. 8 is a flowchart illustrating a method for scan sequencing in an ultrasound imaging system, in accordance with yet another exemplary embodiment of the invention. 802 and 804 are identical to 302 and 304 respectively. At 806, modification module 206 modifies an interleave group size by determining a new PRI which results in a new interleave factor. The new interleave factor is an integer, which evenly divides the total number of colorflow imaging vectors into interleave groups. Further, the integer is in a specific range (and all subranges there between) with respect to the interleave factor. In an embodiment of the invention, the integer is in the range of interleave factor±three, (and all subranges there between). Modification module 206 modifies the interleave group size by dividing the total number of colorflow imaging vectors into interleave groups based on the integer. Originally, the last interleave group is beyond the colorflow ROI, and is therefore not involved in the formation of the ultrasound image. However, by modifying the interleave group size, the last interleave group is included in the colorflow ROI. Once the interleave factor is adjusted, the non-displaying vectors will no longer need to be fired, thus saving time and increasing frame rate. For the example of FIG. 5, there are 16 total vectors that are desired to be displayed in the ROI. The interleave factor was 5, but by changing the interleave factor to 4 (e.g., changing the PRF (1/PRI)) the 16 total vectors will divide evenly by 4 and non-displayed vectors are not needed.

For example, consider a situation in which a total number of colorflow imaging vectors is 36, and an interleave factor determined by factor calculation module 202 is five. Division module 204 divides the colorflow imaging vectors into eight interleave groups. Each of the first, second, third, fourth, fifth, sixth, and seventh interleave group includes five colorflow imaging vectors. However, the eighth interleave group includes one colorflow imaging vector. Modification module 206 determines a new interleave factor that is an integer equal to four. Modification module 206 modifies the interleave group size of five to an interleave group size of four by dividing the total number of colorflow imaging vectors into nine interleave groups based on the integer.

In another example, consider a situation in which a total number of colorflow imaging vectors is 36, and an interleave factor determined by factor calculation module 202 is five. Division module 204 divides the colorflow imaging vectors into eight interleave groups. Each of the first, second, third, fourth, fifth, sixth, and seventh interleave group includes five colorflow imaging vectors. However, the eighth interleave group includes one colorflow imaging vector. Modification module 206 determines a new interleave factor that is an integer equal to six. Modification module 206 modifies the interleave group size of five to an interleave group size of six by dividing the total number of colorflow imaging vectors into six interleave groups based on the integer.

Figure 9:
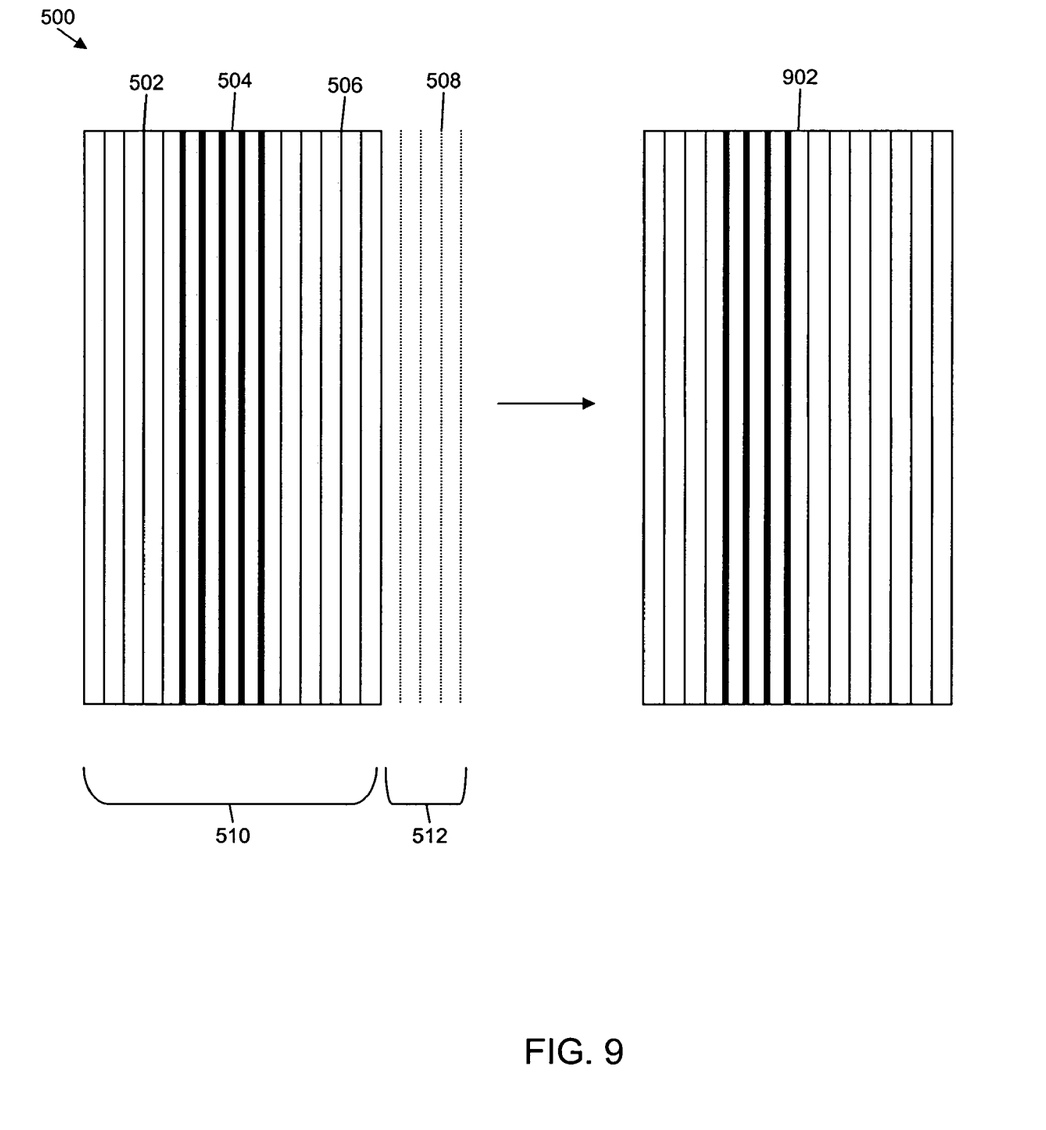
FIG. 9 is a block diagram illustrating the effect of applying the method for scan sequencing in an ultrasound imaging system, in accordance with FIG. 8.

FIG. 9 is a block diagram that exemplifies the effect of applying the method for scan sequencing in an ultrasound imaging system, in accordance with FIG. 8. The example uses pattern 500 that has been described in conjunction with FIG. 5. A pattern 902 shows the effect of modifying the interleave group size. Modification module 206 determines a new interleave factor that is an integer equal four. Modification module 206 modifies the interleave group size of five to an interleave group size of four by dividing the total number of colorflow imaging vectors into four interleave groups based on the integer.

Various embodiments of the invention provide an ultrasound colorflow imaging system that allows all the colorflow imaging vectors to be used in the formation of an ultrasound image. This is done by positioning all the colorflow imaging vectors within the colorflow ROI. Further, various embodiments of the invention provide an ultrasound colorflow imaging system that reduces the spatial distance between the colorflow imaging vectors. Various embodiments of the invention further provide an ultrasound colorflow imaging system that eliminates the time spent acquiring information that is acquired from the digitized signals that are not displayed in the colorflow ROI and thus increases the frame rate of the scanner.

A technical effect of the invention is to allow all the colorflow imaging vectors to be used in the formation of an ultrasound image. This is done by positioning all the colorflow imaging vectors within the colorflow ROI. Another technical effect of the invention is to reduce the spatial distance between the colorflow imaging vectors. Yet another technical effect of the invention is to eliminate the wastage of the information that is acquired from the digitized signals that are produced by the colorflow imaging vectors, which are not displayed in the colorflow ROI.

The various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for scan sequencing in an ultrasound colorflow imaging system, said method comprising:
   determining an interleave factor based at least partially on a pulse repetition interval;
   dividing a total number of colorflow imaging vectors into interleave groups based on the interleave factor; and
   modifying at least one scan sequencing parameter such that at least one of a colorflow imaging vector parameter and a colorflow region of interest (ROI) are modified wherein all colorflow imaging vectors are included in the colorflow ROI.

2. A method according to claim 1 wherein modifying at least one scan sequencing parameter comprises decreasing a spacing between colorflow imaging vectors such that all colorflow imaging vectors are included in the colorflow ROI.

3. A method according to claim 1 wherein modifying at least one scan sequencing parameter comprises modifying colorflow imaging vector positions such that all colorflow imaging vectors are included in the colorflow ROI.

4. A method according to claim 1 wherein modifying at least one scan sequencing parameter comprises calculating a position for subsequent beamforming parameters for a new set of colorflow imaging vectors, the new set of colorflow imaging vectors being an integer number of the interleave group number.

5. A method according to claim 1 wherein modifying at least one scan sequencing parameter comprises changing a lateral width of the ROI to accommodate all colorflow imaging vectors.

6. A method according to claim 1 wherein modifying at least one scan sequencing parameter comprises modifying an interleave group size to divide evenly into the total number of colorflow imaging vectors included in the ROI.

7. A method according to claim 1 wherein modifying at least one scan sequencing parameter comprises:
   determining an integer that is approximately equal to the interleave factor and evenly divisible by into the total number of colorflow imaging vectors included in the ROI; and
   modifying an interleave group size to that of the determined integer.

8. A system configured to scan tissue in a body using transmit ultrasound beams, said system comprising a processor configured to:
   determine an interleave factor based at least partially on a pulse repetition interval;
   divide a total number of colorflow imaging vectors into interleave groups based on the interleave factor; and
   modify at least one scan sequencing parameter such that at least one of a colorflow imaging vector parameter and a colorflow region of interest (ROI) are modified wherein all colorflow imaging vectors are included in the colorflow ROI.

9. A system according to claim 8 wherein to modify at least one scan sequencing parameter, said processor is configured to decrease a spacing between vectors such that all vectors are included in the colorflow ROI.

10. A system according to claim 8 wherein to modify at least one scan sequencing parameter, said processor is configured to modify vector positions such that all colorflow imaging vectors are included in the colorflow ROI.

11. A system according to claim 8 wherein to modify at least one scan sequencing parameter, said processor is configured to calculate a position for subsequent beamforming parameters for a new set of colorflow imaging vectors, the new set of colorflow imaging vectors being an integer number of the interleave group number.

12. A system according to claim 8 wherein to modify at least one scan sequencing parameter, said processor is configured to extend a size of the ROI so that all colorflow imaging vectors will be displayed.

13. A system according to claim 8 wherein to modify at least one scan sequencing parameter, said processor is configured to modify an interleave group size to divide evenly into the total number of colorflow imaging vectors included in the ROI.

14. A system according to claim 8 wherein to modify at least one scan sequencing parameter, said processor is configured to:

determine an integer that is approximately equal to the interleave factor and evenly divisible by into the total number of colorflow imaging vectors included in the ROI; and modify the interleave group size to that of the determined integer.

15. A method for displaying interleaved colorflow imaging vectors in a colorflow imaging ultrasound system, said method comprising:

determining an interleave factor and an interleave group size for the colorflow imaging vectors;

modifying at least one vector imaging characteristic such that at least one of a colorflow imaging vector parameter and a colorflow region of interest (ROI) are modified wherein all colorflow imaging vectors are included in a display; and displaying the colorflow imaging vectors on the display.

16. A method according to claim 15 further comprising calculating an integer that is approximately equal to the interleave factor and evenly divisible by into a total number of vectors included in a region of interest.

17. A method according to claim 15 wherein modifying at least one vector imaging characteristic comprises at least one of decreasing a spacing between colorflow imaging vectors and adjusting colorflow imaging vector positions such all colorflow imaging vectors are included in a region of interest.

18. A method according to claim 15 wherein modifying at least one colorflow vector imaging characteristic comprises at least one of adjusting a lateral width of a region of interest and extending a size of the region of interest.

* * * * *